United States Patent Office 2,780,628
Patented Feb. 5, 1957

2,780,628

2-SUBSTITUTED AROMATIC THIAZOLES

Herschel D. Porter, Indianapolis, Ind., assignor to Eli Lilly and Company, Indianapolis, Ind., a corporation of Indiana No Drawing. Application December 7, 1955,
Serial No. 551,527

8 Claims. (Cl. 260—304)

My invention relates to a process for the preparation of substituted thiazoles. More particularly, it relates to a process for the preparation of thiazoles substituted in the 2-position in which the carbon atoms in the 4- and 5-positions form part of an aromatic carbocyclic ring system.

My process for the preparation of thiazoles substituted in the 2-position comprises reacting an ortho aminothiol represented by the formula

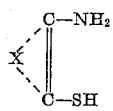

wherein X is the residue of an aromatic carbocyclic ring system, with an organic compound containing a substantially stable thioamide grouping.

The ortho aminothiols useful in carrying out my novel process are those in which the amino and thiol groups are attached to neighboring carbon atoms in an aromatic carbocyclic ring system. Among the aromatic carbocyclic ring systems that I find useful are benzene, naphthalene, biphenyl and the like. Illustrative examples of aromatic carbocyclic ring systems containing the ortho aminothiol grouping which are useful in performing my invention are ortho aminobenzenethiol, 2-aminonaphthalene-1-thiol, 1-aminonaphthalene-2-thiol and the like. I can also employ substituted aromatic carbocyclic ring systems in carrying out my invention. The substituting group in such instances can be one or more of the usual type associated with aromatic substitution, as for example, alkyl groups, aryl groups, halogens, alkoxy groups, hydroxy groups, ester groups, amino groups, acid groups, and nitriles. Ortho aminothiols of substituted aromatic carbocyclic ring systems are illustratively 4-chloro-2-aminobenzenethiol, 5-chloro-2-aminobenzenethiol, 3,5-dichloro - 2 - aminobenzenethiol, 4,6-dicloro-2-aminobenzenethiol, 3,5,6 - trichloro - 2-aminobenzenethiol, 4-nitro-2-aminobenzenethiol, 3-amino-2-mercaptotoluene, 5-chloro-2-amino-3-mercaptotoluene, 4-amino-3-mercaptotoluene, 3-amino-4-mercaptotoluene, 6 -chloro-4-amino-3-mercaptophenol, 2-amino-5-anilino-3-methoxybenzenethiol, 4-amino - 1 - ethoxy-3-mercaptonaphthalene, 4,4'-diamino-3,3' - dimercaptodiphenyl, 5 - nitro-2-aminobenzenethiol, 4,6-diamino-3-mercaptotoluene, 2,5-diaminodithiohydroquinone, and 2 - amino - 5 - dimethylaminobenzenethiol. Throughout the discussion and examples which follow, ortho aminobenzenethiol is utilized as being illustrative of an aromatic carbocyclic ring system containing the ortho aminothiol grouping, which is one reactant in my process. However, it should be understood that ortho aminobenzenethiol is used solely for convenience, and that the invention can be practiced with any ortho aminothio grouping provided that this grouping is part of an aromatic carbocyclic ring system.

The other reactant in my process is an organic compound containing a substantially stable thioamide grouping. To be so classified, the organic thioamide must be stable to hydrolytic reaction, for example, the thioamide grouping should be substantially unaffected by contact with water for 20 minutes at 25° C. or for 1 minute at 100° C. In addition, the remainder of the organic molecule must be substantially stable to heating at 150° C. for periods of 1 hour or more. Such stable thioamides are those in which the carbon atom of the thioamide grouping is linked to the remainder of the organic molecule through another carbon, through an amine nitrogen, through oxygen, or through sulfur. The thioamide grouping can be written as

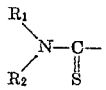

in which the free valence on the carbon atom is the point of attachment to the remainder of the organic molecule. In the above formula, $R_1$ and $R_2$ can be hydrogen atoms, lower alkyl radicals containing from 1 to 8 carbon atoms, aryl radicals, aralkyl radicals, substituted aryl radicals, and when $R_1$ and $R_2$ are taken together, the atoms necessary to complete a piperidyl, a pyrrolidyl, or morpholyl grouping or the like. When the thioamide grouping is attached to an amine nitrogen, to oxygen or to sulfur, $R_1$ and $R_2$ are hydrogen or lower alkyl groups, so that the second reactant in my process becomes a thiourea, a substituted thiourea, a thiocarbamate, or a dithiocarbamate. When a mono-substituted thiourea is used in my process, the unsubstituted $NH_2$ group reacts more rapidly with the ortho aminothiol than does the substituted $NH_2$ group, thus yielding a thiazole susbtituted in the 2-position with a substituted amino grouping.

Substantially stable thioamides in which the thioamide grouping is linked to carbon are also operative in this process. The carbon atom which carries the thioamide linkage can be either an aliphatic carbon atom or a carbon atom of an aromatic system. A convenient source of such thioamides linked through a carbon atom is the Willgerodt reaction in its numerous modifications, which customarily provides a thiomorpholide, a thiopiperidide, an unsubstituted thioamide, or the like. The Willgerodt reaction is discussed in articles written by Carmack and Spielman, Organic Reactions, vol. III, page 83 et seq., Wiley, 1946, and H. D. Porter, J. Amer. Chem. Soc. 76, 127 (1954). I have found that the thioamides provided by the Willgerodt reaction are substantially stable and therefore useful for the purposes of this invention.

Illustratively, the substantially stable thioamides employed in my novel process with the thioamide grouping linked to carbon, amine nitrogen, ether oxygen, or sulfur can be represented by the following formula

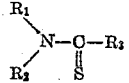

in which $R_1$ and $R_2$ have the same significance as before, and $R_3$ is an alkyl radical, an aralkyl radical, an aryl radical, a substituted aryl radical, a substituted aralkyl radical, an amine radical, a substituted amine radical, an alkoxy radical, or an alkyl mercapto radical. Substantially stable thioamides of the type and variety represented by the above formula are, illustratively, thiobenzamide, N-thiopicolinoyl morpholine, thionicotinamide, sym-diethylthiourea, thiourea, p-methoxyphenyl-thiourea, p-dimethylaminothiobenzopiperidide, thioacetamide, thiopropionamide, p-aminothiobenzamide, p-monomethylaminothiobenzamide, sym-diphenylthiourea, thiobenzanilide, N-butylthiourea, thioisobutyramide, thiosemicarbazide, 3,4-dimethylphenylthioacetyl morpholide, 3-methyl-4-methoxyphenylthioacetyl morpholide, 3-methoxyphenylthioacetyl morpholide, 3-ethoxyphenylthioacetyl morpholide, 2,5-dimethoxyphenylthioacetyl morpholide, 2-ethoxyphenylthioacetyl morpholide, thiobenzopyrrolidide, N-thioisonicotinoyl morpholine, N-thioisonicotinoyl morpholine methiodide, thiopicolinanilide, p-nitrothiobenzanilide, N-2-pyridylthiobenzamide, N-2-pyridylthiopicolinamide, p-nitrothiobenzopiperidide, N-p-ethoxyphenyl - p-nitrothiobenzamide, thiourethane, dithiourethane, thioisonicotinamide, thiopicolinamide, diphenylthioacetamide, β-p-methoxyphenylthiopropiomorpholide, N,N-bis-p-ethoxyphenyldithio-oxalamide, 2-(2-pyridyl)-thiocarbamylbenzothiazole, and N-(p-chlorothiobenzoyl)-morpholine.

According to my invention, my process for the preparation of thiazoles substituted in the 2-position is a one-step process which can be carried out in an ordinary reaction vessel, at ordinary pressures and temperatures. My process avoids the use of high pressure or an excessive reaction temperature as has been common in the prior methods of preparing thiazoles substituted in the 2-position. My process is performed as follows: The ortho aminothiol, illustratively ortho aminobenzenethiol, is mixed with the stable thioamide, illustratively thiobenzamide, and the mixture is heated at elevated temperature until the process of forming 2-phenylbenzothiazole is complete. A 10% molar excess of the ortho aminothiol-containing compound is generally employed, although substantially equimolar quantities are equally satisfactory as regards final yield. A convenient temperature for heating has been 150° C. However, temperatures in the range of from about 75° C. to 200° C. are operative, subject to the following conditions: The reaction temperature should be high enough that the reaction mixture is substantially homogeneous. With certain high melting thioamides, as for example, p-methoxyphenylthiourea, a higher temperature is necessary to achieve a homogeneous reaction mixture. With simple thioamides containing an $NH_2$ group, a heating period of 2 hours is usually adequate. Where the thioamide is more complex and contains a substituted amide grouping, such as a morpholide or piperidide grouping, more prolonged heating is frequently necessary to obtain maximal yields. Reaction mixtures can be heated at about 150° C. for as long as 24 hours or more without excessive formation of unwanted by-products.

Isolation of the 2-substituted thiazole formed by this process can be accomplished by the usual methods of the art. For example, solid thiazoles are isolated as follows: The cooled reaction mixture is dissolved in a suitable solvent such as ethyl acetate and this solution is then diluted with a second solvent, such as hexane, to the point of incipient precipitation. The desired thiazole then crystallizes from solution on chilling, and is isolated by filtration. If one or more volatile starting materials are employed, a prior evaporation of these volatile substances by heating the reaction mixture in vacuo aids in the purification process. In the event the substituted thiazole is a liquid, ordinary distillation in vacuo serves to perform the necessary purification. Yields of 2-substituted thiazoles prepared as above are usually upwards of 60%.

In some instances, a solvent for the reaction mixture is desirably employed, as when one reactant has an extremely high melting point and consequently a homogeneous reaction mixture is difficult to attain without undue decomposition of either reactants or final product. A solvent can also be used for convenience. Solvents useful for this process are those solvents which are non-reactive, as for example, pyridine, dioxan, and the like. It should be noted, however, that when a solvent is used which has a boiling point substantially below 150° C., a greatly prolonged heating time at the reflux temperature of the reaction mixture is necessary if maximal yields are to be obtained.

Thiazoles substituted in the 2-position which can be prepared by the process of my invention are as follows: 2-(p-methylaminophenyl) - 5-chlorobenzothiazole, 2-)p-chlorophenyl)-4,6-dichlorobenzothiazole, 2-(o-tolyl)-5-nitrobenzothiazole, 2-ethoxy - 7 - methylbenzothiazole, 2-(p-anisyl)-6-methylbenzothiazole, 2 - n-amyl-5-amino-6-methylbenzothiazole, 2-iso-octyl - 5 - dimethylaminobenthiazole, 2-ethylmercapto-6-chlorobenzothiazole, 2-(p-cyanophenyl)-4,6,7-trichlorobenzothiazole, 2 - (o-tolyl)-4-methylbenzothiazole, 2-hydrazinobenzothiazole, 2(2'-benzothiazolyl)-benzothiazole, 2-phenethylnaphtho [1.2] thiazole, 2,6-bis - (p-methylaminophenyl)benzo[1.2.4.5] bis-thiazole, 2,2'-bis-(p-ethylaminophenyl) - 6,6'-dibenzothiazole, 2-(p-diaminophenyl)-naphtho[2.1]thiazole, and 2-benzyl-5-ethoxynaphtho [1.2]thiazole.

This invention is further illustrated by the following specific examples:

EXAMPLE 1

*Preparation of 2-phenylbenzothiazole*

13.7 g. of thiobenzamide and 13.8 g. of 2-aminobenzenethiol were mixed and then heated at 150° C. for 2 hours. The reaction mixture comprising 2-phenylbenzothiazole was cooled and then recrystallized from 300 ml. of ethanol. Two crops of crystalline 2-phenylbenzothiazole melting at about 110–112° C. were obtained therefrom, weighing about 16.7 g., thus giving a yield of 79% theoretical.

EXAMPLE 2

*Preparation of 2-(2-pyridyl)-benzothiazole*

10.4 g. of N-thiopicolinoyl morpholine and 6.9 g. of 2-aminobenzenethiol were mixed and then heated at 150° C. for 2 hours. After cooling, the reaction mixture comprising 2-(2-pyridyl)-benzothiazole, was diluted with 300 ml. of ethanol. On cooling, this solution deposited yellow crystals of 2-(2-pyridyl)-benzothiazole which were collected by suction filtration. These crystals weighed about 6.7 g. and after drying, their melting point was about 131–133.5° C. Two more crops of crystalline 2-(2-pyridyl)-benzothiazole were obtained from the mother liquors. These two crops were combined and recrystallized from ethanol, yielding an additional 0.5 g. of 2-(2-pyridyl)-benzothiazole melting at about 131–133.5° C. The total weight of crystals thus obtained was 7.2 g. It represented a yield of 68% of theoretical.

EXAMPLE 3

*Preparation of 2-(3-pyridyl)-benzothiazole*

6.9 g. of thionicotinamide and 6.9 g. of 2-aminobenzenethiol were reacted following the method of Example 1, and the compound resulting from that reaction, 2-(3-pyridyl)-benzothiazole, was crystallized also by the method of Example 1. 8.9 g. of 2-(3-pyridyl)-benzothiazole, a yellow crystalline substance melting at about 123.5–126° C., were obtained, representing a yield of 85% of theoretical.

*Analysis.*—Calc'd. for $C_{12}H_8N_2S$: C, 67.90; H, 3.80; N, 13.20. Found: C, 67.74; H, 3.80; N, 12.79.

EXAMPLE 4

*Preparation of 2-ethylaminobenzothiazole*

13.2 g. of sym-diethylthiourea and 13.7 g. of 2-aminobenzenethiol were dissolved in 50 ml. of dry pyridine and the mixture heated at reflux temperature for 4 hours. The pyridine was then removed in vacuo. A crystalline residue of 2-ethylaminobenzothiazole remaining in the flask was recrystallized from 75 ml. of ethanol. Upon cooling this solution, yellow crystals of 2-ethylaminobenzothiazole were deposited and were collected by filtration. These crystals weighed 5.7 g., and melted at about 88–92° C. Recrystallization of the 2-ethylaminobenzothiazole thus obtained from a mixture of ethyl acetate and hexane gave glistening yellow plates which melted at about 92–94° C. after drying.

From the original filtrate, 53% of the starting sym-diethylthiourea was recovered; therefore, the yield of 2- ethylaminobenzothiazole based on recovered starting material was 65% of theoretical.

A similar preparation to the above, but using dioxan as a solvent, gave substantially the same results.

EXAMPLE 5

*Preparation of 2-(p-methoxyanilino)-benzothiazole*

2-(p-methoxyanilino)-benzothiazole was prepared from 18.2 g. of p-methoxyphenylthiourea and 13.8 g. of 2-aminobenzenethiol by the method of Example 1 except that the reaction temperature was 180° C. Crystallization of the residue from a mixture of ethyl acetate and hexane yielded 16.3 g. of 2-(p-methoxyanilino)-benzothiazole melting at about 158–160° C. A second crop of crystals were obtained from the mother liquor and upon recrystallization, yielded an additional 2 g. of 2-(p-methoxyanilino)-benzothiazole melting in the range of 158–160° C.

EXAMPLE 6

*Preparation of 2-aminobenzothiazole*

38 g. of thiourea and 62.6 g. of 2-aminobenzenethiol were reacted by the method of Example 1. Upon cooling the reaction mixture, 2-aminobenzothiazole crystallized and was then dissolved in a mixture of 1 l. of benzene, 1 l. of ethyl acetate, and 300 ml. of 5% HCl. The organic layer was separated and then further extracted with four 300 ml. portions of 5% HCl. The combined acidic extracts were evaporated to dryness in vacuo and the resulting residue, comprising the hydrochloride salt of 2-aminobenzothiazole, was dissolved in 800 ml. of water. This solution was made alkaline with ammonium hydroxide and the resulting precipitate, the free base of 2-aminobenzothiazole, was collected. 32.6 g. of 2-aminobenzothiazole were obtained after drying, melting at about 122–124° C.

In addition, 8.2 g. of 2-mercaptobenzothiazole were recovered from the acid-extracted benzene-ethyl acetate layer, described above. The 2-mercaptobenzothiazole was isolated as follows: The benzene-ethyl acetate layer was extracted with four 400 ml. portions of 5% sodium carbonate, whereupon the 2-mercaptobenzothiazole went into the aqueous solution as the sodium salt. The aqueous alkaline extracts were combined, washed with ether, and then acidified. The resulting precipitate of 2-mercaptobenzothiazole was collected and melted at about 178–180° C.

EXAMPLE 7

*Preparation of 2-(p-dimethylaminophenyl)-benzothiazole*

24.8 g. of p-dimethylaminothiobenzopiperidide and 13.8 g. of 2-aminobenzenethiol were mixed and then heated at 150° C. for 2 hours. The reaction mixture comprising 2-(p-dimethylaminophenyl)-benzothiazole and starting materials was dissolved in 300 ml. of boiling ethyl acetate, and to this solution, after chilling, was added an equal volume of hexane. The resulting precipitate consisting of long yellow needles of p-dimethylaminothiobenzopiperidide, a starting material, was collected and dried. The weight of this recovered material was 12.6 g., representing a recovery of 50.8%. By the process of concentrating the filtrate, adding more hexane and then cooling the resulting solution, three further crops of crystals of mixed composition were obtained. These weighed 7.6 g. after combining, and melted widely in the range of 129–140° C. Recrystallization of this material from ethanol yielded 3.1 g. of fine, white needles of 2-(p-dimethylaminophenyl)-benzothiazole which melted at about 170.5–172.5° C.

A second preparation of this material following the above method but heating for 24 hours yielded 17.7 g. of 2-(p-dimethylaminophenyl)-benzothiazole melting at about 170–172° C. and representing a yield of 70%.

Dilute aqueous solutions of 2-(p-dimethylaminophenyl)-benzothiazole have a bluish-white fluorescence and the compound therefore has utility of the type hereinafter described.

EXAMPLE 8

*Preparation of 2-methylbenzothiazole*

16.5 g. of thioacetamide and 25 g. of 2-aminobenzenethiol were mixed and then heated at 150° C. for 2 hours. After cooling, the reaction mixture containing the 2-methylbenzothiazole, was diluted with 300 ml. of water and made alkaline with dilute KOH. The mixture was then subjected to steam distillation until oily droplets of 2-methylbenzothiazole ceased to appear in the distillate. The oily organic layer of the distillate was separated from the water layer and the water layer was then extracted with ether. The ether extracts and organic layer were combined and dried. The ether was removed by distillation at atmospheric pressure and the residue then distilled in vacuo. The fraction boiling at 92–96° C. at a pressure of 4 mm. of mercury was collected and consisted of 2-methylbenzothiazole. This fraction weighed 23 g., representing a yield of 77%. The compound had a refractive index as follows: $n_D^{25}=1.6142$. In the same way thioacetamide can be reacted with 4-amino-1-ethoxy-3-mercaptonaphthalene to yield 2-methyl-5-ethoxynaphtho[1.2]-thiazole.

EXAMPLE 9

*Preparation of 2-(p-aminophenyl)-benzothiazole*

15.2 g. of p-aminothiobenzamide and 13.8 g. of 2-aminobenzenethiol were mixed and were then heated at 150° C. for 2 hours. The cooled reaction mixture, comprising 2-(p-aminophenyl)-benzothiazole, was dissolved in 150 ml. of hot ethyl acetate and then diluted with 300 ml. of hexane. Yellow crystals of 2-(p-aminophenyl)-benzothiazole deposited after cooling. These were collected and after drying melted at about 150–153° C. Their weight was 13.7 g. Two further crops of crystalline 2-(p-aminophenyl)-benzothiazole were obtained from the mother liquors. These two crops of crystals were combined and recrystallized from a mixture of ethyl acetate and hexane. An additional 2.4 g. of 2-(p-aminophenyl)-benzothiazole melting at about 150–153° C. was obtained. The total yield was 71% of theoretical.

This compound also showed a purplish fluorescence in aqueous solution.

The thiazoles substituted in the 2-position such as the above which are synthesizable by my novel process, are useful in many fields. United States Patent No. 2,550,321, April 24, 1951, discloses substituted benzothiazoles which are employed as fluorescent-dye soap additives which give bleached cotton materials a "whiter-than-white" look. Other substituted benzothiazoles are useful as pharmaceuticals and fungicides. In addition to the above uses, this invention provides 2-substituted thiazoles which are useful intermediates in that they can be converted by the standard procedures of organic chemistry to other products which are in turn useful in the above fields.

I claim:

1. A process for the preparation of thiazoles substituted in the 2-position which comprises heating together an ortho aminothiol represented by the formula

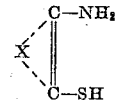

wherein X is the residue of an aromatic carbocyclic ring system, and a substantially stable thioamide.

2. A process for the preparation of thiazoles substituted in the 2-position which comprises mixing an ortho aminothio represented by the formula

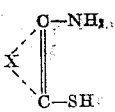

wherein X is the residue of an aromatic carbocyclic ring system, with a substantially stable thioamide, and heating said mixture in the range from about 75° C. to about 200° C. until the reaction is substantially complete.

3. A process for the preparation of thiazoles substituted in the 2-position which comprises mixing an ortho aminothiol represented by the formula

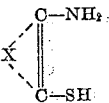

wherein X is the residue of an aromatic carbocyclic ring system, with a substantially stable thioamide, and heating said mixture in the range from about 75° C. to about 200° C. until the reaction is substantially complete and isolating the thiazole substituted in the 2-position therefrom.

4. A process for the preparation of thiazoles substituted in the 2-position which comprises heating an ortho aminothiol represented by the formula

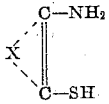

wherein X is the residue of an aromatic carbocyclic ring system, with a substantially stable thioamide in the presence of an inert, mutual solvent at the reflux temperature of the solution until the reaction is substantially complete, said reflux temperature falling within the temperature range of 75° C. to 200° C.

5. A process for the preparation of thiazoles substituted in the 2-position which comprises heating an ortho aminothiol represented by the formula

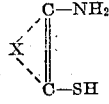

wherein X is the residue of an aromatic carbocyclic ring system, with a substantially stable thioamide in the presence of an inert, mutual solvent at the reflux temperature of the solution, said reflux temperature falling within the temperature range of 75° C. to 200° C., until the reaction is substantially complete and isolating the thiazole substituted in the 2-position therefrom.

6. A process for the preparation of thiazoles substituted in the 2-position which comprises heating an ortho aminothiol represented by the formula

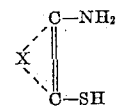

wherein X is the residue of an aromatic carbocyclic ring system, with a substantially stable thioamide of the type provided by the Willgerodt reaction.

7. A process for the preparation of a compound of the formula

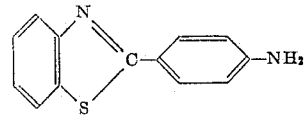

which comprises heating ortho aminobenzenethiol with p-aminothiobenzamide.

8. A process for the preparation of a compound of the formula

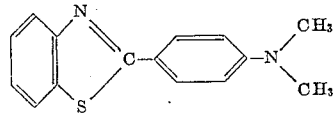

which comprises heating ortho aminobenzenethiol with p-dimethylaminothiobenzopiperidide.

References Cited in the file of this patent

Gabriel et al.: Beilstein (Handbuch, 4th ed.), p. 425 (1926).